United States Patent [19]
Coetsier et al.

[11] Patent Number: 5,804,723
[45] Date of Patent: Sep. 8, 1998

[54] VEHICLE WHEEL BALANCER WITH RETRACTABLE COVER

[75] Inventors: Paul Coetsier, Pomponne; Olivier Sauzay, Coudray, both of France

[73] Assignee: Muller BEM, Chartres Cedex, France

[21] Appl. No.: 721,318

[22] Filed: Sep. 25, 1996

[30] Foreign Application Priority Data

Oct. 4, 1995 [FR] France ................................. 95 11655

[51] Int. Cl.⁶ ........................................................ G01M 1/02
[52] U.S. Cl. ................................................ 73/475; 73/487
[58] Field of Search ........................... 73/475, 487, 462; 74/609

[56] References Cited

U.S. PATENT DOCUMENTS

| | | |
|---|---|---|
| 3,330,159 | 7/1967 | Ongaro .................................. 73/487 |
| 3,521,495 | 7/1970 | Schildmeier . |
| 4,336,715 | 6/1982 | Arnold .................................. 73/475 |
| 5,189,912 | 3/1993 | Quinlan ................................ 73/487 |
| 5,509,307 | 4/1996 | Humber ................................ 73/462 |

*Primary Examiner*—Christine K. Oda
*Attorney, Agent, or Firm*—Young & Thompson

[57] ABSTRACT

A vehicle wheel balancer, comprising a support frame (1), a rotatable drive head (3) adapted removably to receive a wheel to be balanced, and a protective member enclosing the mounted wheel so as to prevent undesirable projection of particles outwardly and to protect the operator during rotation of the wheel. The protective member is in two parts comprising a first cover (6) fixed relative to the support frame (1) and a second cover (7) swingably retractable about a substantially horizontal axis (8) of rotation, so as to reduce the mass that must be displaced and to permit manual opening and closing of the protective member without mechanical assistance and without a counterweight and to reduce the floor space of the balancer.

10 Claims, 2 Drawing Sheets

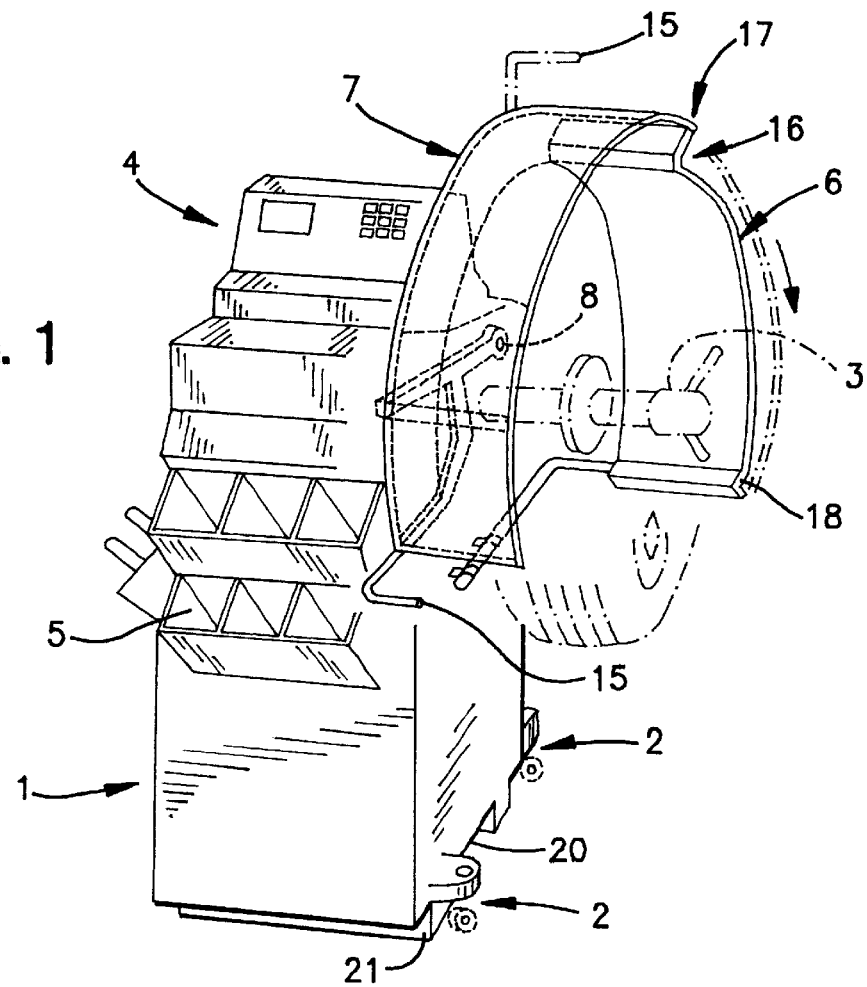
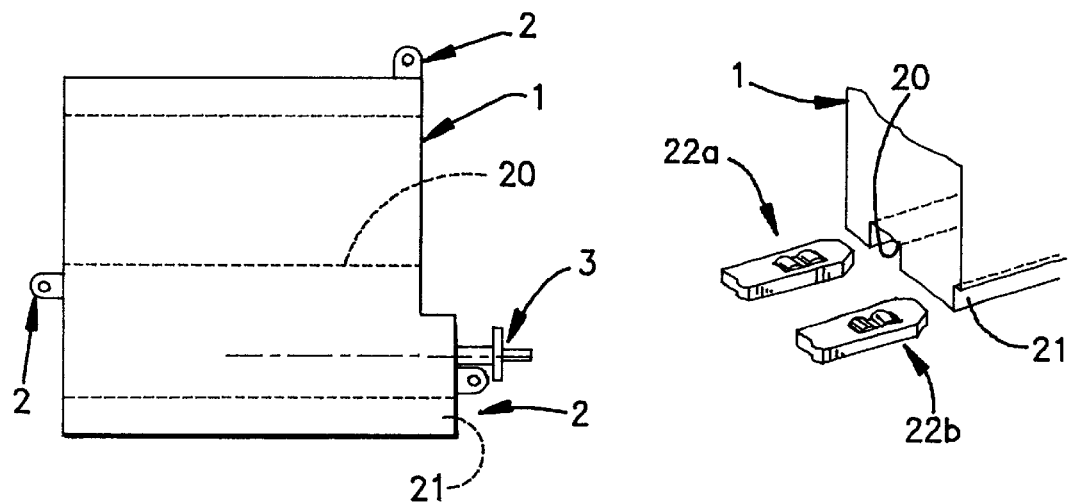

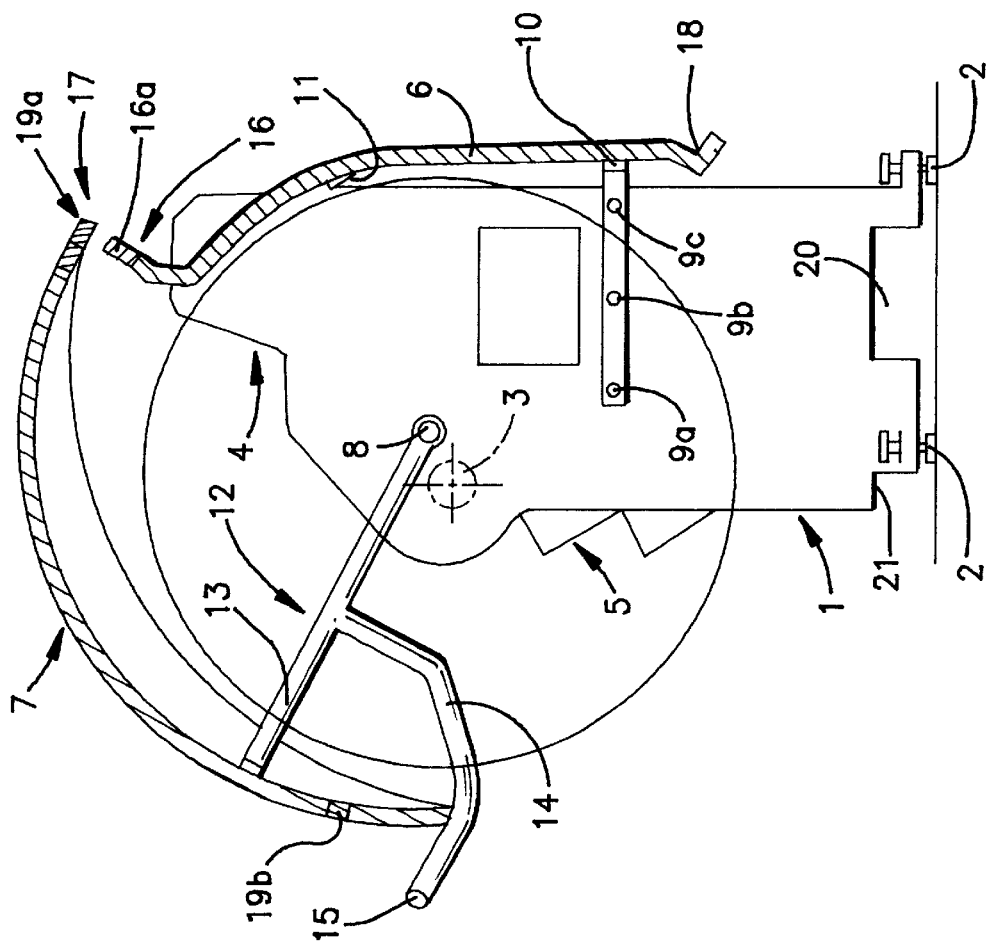
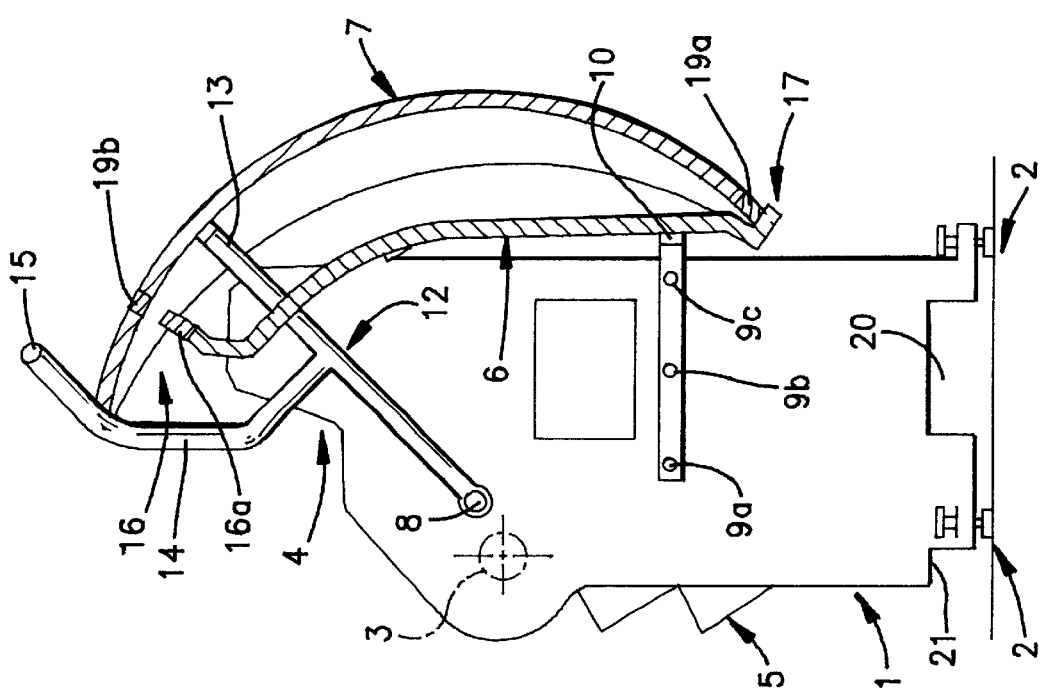

VEHICLE WHEEL BALANCER WITH RETRACTABLE COVER

FIELD OF THE INVENTION

The invention relates to a vehicle wheel balancer, of the type comprising a support frame, a rotatable drive head adapted removably to receive a wheel to be balanced and comprising suitable detectors connected to an electric control panel for interactive measurement, control and inspection, as well as a protective member enclosing the mounted wheel so as to avoid undesirable projection outwardly of particles and to protect the operator during rotation of the wheel.

BACKGROUND OF THE INVENTION

These wheel balancers of known type are provided to balance wheels of variable diameters and widths of wheel rim, which are mounted for this purpose on the rotatable drive head. Because of the wide possible variation of dimensions and weights of the wheels to be balanced, it is necessary to provide these balancers with a protective member of relatively large size whose manual opening and closing is rendered difficult if there are no means to assist in the retraction of the protection member or if this protective member is not provided with a counterweight permitting balancing the weight of the protective cover.

This protective member is relatively cumbersome and requires for its opening a large floor space behind the machine: this leads users of the balancers of known type to leave an unoccupied empty space over all the length of the balancer behind the latter. This exacts a penalty when the balancer is positioned against a wall.

SUMMARY OF THE INVENTION

An object of the invention is to provide a vehicle wheel balancer whose protective member is easily retractable manually without requiring any assistance means or any counterweight, whilst permitting balancing of wheels over a wide range of diameters and widths of wheel rim and whose floor space is less than that of the balancers of the prior art.

The invention has for an object a vehicle wheel balancer, of the type comprising a support frame, a rotatable drive head adapted removably to receive a wheel to be balanced and comprising suitable detectors connected to a central electronic control panel for interactive measurement, control and inspection, as well as a protective member enclosing the wheel mounted in such a way as to avoid undesirable projection outwardly of particles and to protect the operator during rotation of the wheel, characterized in that the protective member is formed in two parts: a first cover fixed relative to the support frame and a second retractable cover articulated about a substantially horizontal axis of rotation, so as to reduce the mass displaceable by permitting manual opening and closing of the protective member without assistance means and without counterweights and to reduce the floor space of the balancer.

According to other characteristics of the invention:
the first fixed cover has an upper end extending substantially radially relative to the center of rotative drive of the wheel, this upper end being capped with a clearance permitting the retraction by a first end of the second retractable cover;
the angle to the center of rotatable drive of the wheel of the second retractable cover is greater than the angle to the center of driving rotation of the wheel of the first fixed cover;
the first cover has a lower end forming a recess for receiving and holding the second retractable cover in open position;
the second retractable cover is mounted on a tubular chassis articulated about said substantially horizontal axis of rotation;
the second retractable cover has a handle or like member for grasping and retracting;
the two covers are connected to the frame by members which are displaceable, indexable or of adjustable length, so as to adjust or predetermine the position of the covers without modifying their shape as a function of the external diameter of the wheels to be balanced and to be surrounded.

Because of the large weight of the wheels to be balanced and the important mass represented by the rotatable drive head, the center of gravity of a balancer comprising a wheel mounted on the head is adapted to vary as a function of the dimensions of the wheel to be balanced.

This is why balancers of known type are generally provided with a counterweight disposed to the side of the frame opposite the rotatable drive head.

The height and variability of the center of gravity required until now using slings or raising means to effect the manipulation of the balancers of known type. This has the drawback of requiring costly suitable equipment and of a height often incompatible with that of the balancing shops.

The invention also has for its object to overcome this drawback, by providing a balancer adapted to be raised during handling without the risk of swinging or balancing in the course of transport.

The invention has for its object a vehicle wheel balancer, of the type comprising a support frame, a rotatable drive head adapted removably to receive a wheel to be balanced and comprising suitable detectors connected to an electronic control panel for the inactive measurement of inspection and control, as well as a protective member enclosing the mounted wheel so as to avoid undesirable projection outwardly of particles and to protect the operator during rotation of the wheel, characterized in that the support frame has a passage opening and a lateral recess provided to receive two forks of lifting and handling apparatus and in that the support frame has three bearing feet disposed on opposite sides of said passage opening.

According to other characteristics of the invention:
the lateral recess is located on the side of the support frame on which is located the rotatable drive head;
the lateral recess and the passage opening are positioned and selected as to dimensions, so as to ensure the stability of the balancer in the course of manipulation both in the open position of the protective member and in the closed position of the protective member;
the lateral recess and the passage opening are positioned and so sized, as to ensure the stability of the balancer in the course of manipulation with a wheel mounted on the rotatable drive head.

BRIEF DESCRIPTION OF THE DRAWINGS

The invention will be better understood from the description which follows, given by way of non-limiting example, with reference to the accompanying drawings, in which:

FIG. 1 shows schematically a perspective view of a balancer according to the invention.

FIG. 2 shows schematically a front elevational view of a balancer according to the invention with the protective member open.

FIG. 3 shows schematically a front elevational view of a balancer according to the invention with the protective member closed.

FIG. 4 is a bottom plan view of the balancer according to the invention.

FIG. 5 shows schematically a fragmentary perspective view of a balancer according to the invention.

DETAILED DESCRIPTION OF THE INVENTION

Referring to FIGS. 1–3, a balancer according to the invention comprises a support frame 1 resting on suitable feet 2 in contact with the floor, a rotatable drive head 3 schematically illustrated by the rotatable drive axis 3, adapted removably to receive a wheel to be balanced, a control and inspection station 4 comprising an interactive dialogue screen to send and receive signals for measurement, control and inspection to the rotatable drive head and to indicate to the operator the course of the operations.

A bin for the reception of the balancing weights or small tools is preferably provided at 5, in a manner known per se.

According to the invention, a protective member adapted to enclose a wheel mounted on the rotatable drive head 3 so as to avoid undesirable projection of particles and to protect the operator during rotation of the mounted wheel is comprised of two parts, a first cover 6 fixed relative to the support frame 1 and a second cover 7 articulatedly retractable about a substantially horizontal axis 8 of rotation. The fixed cover 6 is preferably secured removably to the frame 1 by members that are displaceable, indexable or of adjustable length, for example with the aid of a connection bar fixed with the help of bolts 9a, 9b, 9c to the frame 1 and secured to the fixed cover 6 at 10 by means of a T-shaped member fixed by a suitable bolt, or by over-molding of the mentioned bar. The fixed cover 6 is generally secured at at least two points 10 and 11 so as to remain secured to the frame 1 and to avoid any undesirable vibration during drive in rotation of the vehicle wheel to be balanced. The retractable cover 7 is mounted on a chassis 12 pivoted at 8, comprising a first tube 13 connected substantially radially to the corresponding rotative shaft 8 and a branch 14 connected to the forward end of the retractable cover 7. A handle 15 for gripping and holding is provided at this front end to retract the movable cover 7 during opening and closing of the protective member.

The first fixed cover 6 preferably has an upper end 16 extending substantially radially relative to the center 3 for driving in rotation of the wheel. This upper end 16 is kept with clearance by a first end 17 of the second retractable cover. The clearance provided permits retraction of the cover 7 behind the cover 6 in the FIG. 2 position by action on the handle 15, wherein the end 17 comes to rest and is maintained in a receiving recess 18 formed by the lower end of the fixed cover 6.

In open position, the movable cover 7 is thus maintained in stable position because of the bearing of its lower end 17 in the recess 18 of the fixed cover 6 whilst in closed position, a mechanical abutment (not shown) prevents the falling of the movable cover 7 forwardly and downwardly.

Of course, the invention also covers the case in which the movable cover 7 is immobilized in open position and closed by suitable mechanical rotatable abutments.

Preferably, there are provided position detection means permitting knowing the relative position of the covers 6 and 7 with respect to each other. To this end, a magnetic detection sensor 16a is provided at the end 16 of the fixed cover 6 and two magnets 19a, 19b are provided on the movable cover 7 so as to give a signal of closing or opening of the protective member comprising the two covers 6 and 7.

Of course, the opening or closing signal can be used in a program for preventing or permitting the driving in rotation of the wheel mounted on the corresponding shaft with the axis 3, or can be used to actuate an emergency braking system in the case of untimely opening of the protective member, or to supply permission to open the protective member when the speed of driving in rotation of the wheel is less than a predetermined speed. These modifications of programmed control are all within the present invention.

The frame 1 comprises at its lower end an opening 20 and a lateral recess 21. The opening 20 and the lateral recess 21 have predetermined dimensions corresponding to the reception of two forks 22a, 22b of a lifting and handling apparatus of known type operating by raising. This arrangement in which the lateral recess is located on the side of the support frame on which is located the rotative drive head 3, so that the fork 22b extends at least partially externally relative to the vertical passing through the axis of rotation 3, permits ensuring the stability of balancing in the course of manipulation in all positions. In this way, the balancer can be raised and transported in the open position of the protective member (FIG. 2), in the closed position of the protective member (FIG. 3), and in one or the other of these positions with a wheel mounted on the rotatable drive head corresponding to the axis 3.

The invention also provides three support feet 2 which are disposed on opposite sides of the passage opening 20: two support feet 2 are disposed on opposite sides of the frame 1, and on opposite sides of the vertical projection of the axis 3 corresponding to the rotatable drive shaft for the wheel to be balanced, so as to balance the moments of reaction to the rotative drive couple of the wheel; a third foot 2 is secured at one forward end of the frame 1, so as to compensate the swinging couples to the rear resulting from the weight of the wheel to be balanced.

The invention thus permits greatly improving the ease of working during balancing operations, particularly the manipulation of the balancer to facilitate the operations of cleaning and changing the balancing weights, as well as the operations of emplacement, because the floor space for the machine is also reduced by the arrangement providing a protective member in two portions leaving free access for securement, manipulation and arrangement of the wheel and enclosing the mounted wheels in a secure member by eliminating any undesirable projection of particles outwardly.

The invention described with reference to a particular embodiment is in no way thereby limited but on the contrary covers all modification of shape and variation of embodiment within the scope and spirit of the invention.

What is claimed is:

1. In a vehicle wheel balancer, comprising a support frame, a rotatable drive head adapted removably to receive a wheel to be rotated about a first substantially horizontal axis and to be balanced, and a protective member enclosing the mounted wheel so as to prevent undesirable projection of particles outwardly and to protect an operator during rotation of the wheel; the improvement wherein the protective member is in two parts comprising a first cover fixed relative to the support frame, and a second cover swingably retractable about a second axis of rotation, said second axis of rotation being substantially parallel to or coaxial with said first axis so as to reduce the mass that must be displaced and to permit manual opening and closing of the protective member without assistance means and without a counterweight and to reduce the floor space of the balancer.

2. Balancer according to claim 1, wherein the first fixed cover has an upper end extending substantially radially relative to the center of rotation of the rotated wheel, said upper end being capped with clearance by a first end of the second retractable cover to permit retraction of said second retractable cover.

3. Balancer according to claim 1, wherein the angle to the center of rotation of the wheel of the second retractable cover is greater than the angle to the center of rotation of the wheel of the first fixed cover.

4. Balancer according to claim 1, wherein the first fixed cover has a lower end forming a recess for receiving and holding the second cover retracted into open position.

5. Balancer according to claim 1, wherein the second retractable cover is mounted on a tubular chassis articulated about said second axis of rotation, and wherein one end of the second retractable cover carries a handle for moving the second retractable cover.

6. Balancer according to claim 1, wherein the two covers are connected to the support frame so as to adjust the position of the covers as a function of the external diameter of the wheel to be balanced.

7. In a vehicle wheel balancer, comprising a support frame, a rotatable drive head adapted removably to receive a wheel to be rotated about a first substantially horizontal axis and to be balanced, and a protective member enclosing the mounted wheel so as to prevent undesirable projection of particles outwardly and to protect an operator during rotation of the wheel; the improvement wherein the protective member is in two parts comprising a first cover fixed relative to the support frame, and a second cover swingably retractable about a second axis of rotation, said second axis of rotation being substantially parallel to or coaxial with said first axis so as to reduce the mass that must be displaced and to permit manual opening and closing of the protective member without assistance means and without a counterweight and to reduce the floor space of the balancer, wherein the support frame has a passage opening and a lateral recess adapted to receive two forks of a lifting and handling apparatus, and the support frame has three support feet disposed on opposite sides of said passage opening.

8. Balancer according to claim 7, wherein the lateral recess is located on the side of the support frame on which is located the rotatable drive head.

9. Balancer according to claim 7, wherein the lateral recess and the passage opening are so positioned as to ensure the stability of the balancer in the course of manipulation both in the open position of the protective member and in the closed position of the protective member.

10. Balancer according to claim 7, wherein the lateral recess and the passage opening are positioned to ensure the stability of the balancer in the course of manipulation with a wheel mounted on the rotatable drive head.

* * * * *